(12) United States Patent
Tian

(10) Patent No.: US 7,008,980 B2
(45) Date of Patent: Mar. 7, 2006

(54) WATERBORNE COATINGS

(75) Inventor: Dong Tian, Lancaster, PA (US)

(73) Assignee: AWI Licensing Company, Wilmington, DE (US)

( * ) Notice: Subject to any disclaimer, the term of this patent is extended or adjusted under 35 U.S.C. 154(b) by 98 days.

(21) Appl. No.: 10/052,038

(22) Filed: Jan. 17, 2002

(65) Prior Publication Data

US 2002/0106517 A1    Aug. 8, 2002

Related U.S. Application Data

(60) Provisional application No. 60/262,503, filed on Jan. 18, 2001.

(51) Int. Cl.
*C08K 3/20*      (2006.01)

(52) U.S. Cl. .................. 523/406; 523/414; 523/415; 523/416; 523/417; 524/507; 524/512

(58) Field of Classification Search ............... 524/507, 524/512; 523/406, 414, 415, 416, 417
See application file for complete search history.

(56) References Cited

U.S. PATENT DOCUMENTS

| | | | | |
|---|---|---|---|---|
| 3,909,471 A | * | 9/1975 | Ruske | 523/454 |
| 4,340,519 A | * | 7/1982 | Kotera et al. | 523/414 |
| 4,431,689 A | * | 2/1984 | Gunter | 427/388.2 |
| 4,612,049 A | * | 9/1986 | Berner et al. | 106/14.13 |
| 4,781,987 A | * | 11/1988 | Bolgiano et al. | 428/424.6 |
| 5,438,083 A | * | 8/1995 | Takimoto et al. | 523/401 |
| 5,541,251 A | * | 7/1996 | Bontinck et al. | 524/507 |
| 5,623,016 A | * | 4/1997 | Klein et al. | 524/591 |
| 5,859,111 A | * | 1/1999 | Kukkala et al. | 524/458 |
| 6,015,613 A | * | 1/2000 | Kinlen et al. | 428/332 |
| 6,180,244 B1 | * | 1/2001 | Rayner et al. | 428/424.8 |
| 6,448,321 B1 | * | 9/2002 | Tokita | 524/394 |

* cited by examiner

Primary Examiner—Bernard Lipman

(57) ABSTRACT

Waterborne coating compositions, methods of applying such compositions, and substrates coated with such compositions are described. The compositions include an aqueous dispersion of a polyurethane resin, an epoxy resin, and a polyvinyl chloride resin. The compositions can also include an aminoplast such as a melamine, and one or more curing agents. Additionally, the compositions can include flatting agents, colored metallic and/or polymeric particles, hard particles, surfactants, rheology modifiers, defoamers, and coalescing aids. The coating composition can be applied to virtually any surface and cured using conventional heat curing techniques, whether or not there is a chemically embossed layer. However, it is advantageously used in surface coverings in combination with a chemically embossed layer. In one embodiment, the surface covering includes a chemically embossed layer and a cured top layer, which are both cured in a single heating step or plurality of heating steps. Ideally, the top layer has good wear and stain resistance properties, and the chemical embossing in the foamable layer occurs while the top layer is cured. However, the coating composition can be applied to a surface covering that does not include a chemically embossed layer. Optionally, one or more of the above-layers is mechanically embossed.

20 Claims, No Drawings

WATERBORNE COATINGS

This application claims the benefit of provisional application No. 60/262,503 filed on Jan. 18, 2001.

FIELD OF THE INVENTION

This invention is in the area of waterborne coatings, in particular, waterborne coatings to be applied to surface coverings such as floor coverings.

BACKGROUND OF THE INVENTION

Resilient surface coverings, in particular, floor coverings, are widely used. Although they are constructed to have varying degrees of flexibility, they are "resilient" when compared to conventional natural materials, such as ceramic tile.

Chemical embossing has been used to create surface coverings with a desired three-dimensional appearance. Chemical embossing typically involves applying a foamable layer to a substrate, where a foaming agent, inhibitor and/or promoter is applied in a pattern. The foamable layer is subjected to conditions that cause foaming only to occur in selected regions, which regions are in register with the pattern.

Many surface coverings include a wear layer in addition to the chemically embossed foam layer. The wear layer can also include a top coat. The prior art generally teaches chemically embossing a foamable layer, applying a wear layer, and then curing the wear layer. From a processing standpoint, it would be advantageous to be able to cure the wear layer while the foamable layer is being cured. However, a limitation associated with curing the foamable layer and the wear layer at the same time is that if the wear layer is too rigid, the chemical embossing is restricted. If the wear layer is too flexible, the stain resistance and wear properties such as scratch resistance of the wear layer are reduced.

From an environmental standpoint, it is desirable to apply coating compositions to substrates using either one hundred percent solids coating compositions or waterborne coating compositions, to minimize the use of organic solvents. The one hundred percent solids coating compositions typically include photocurable resins, such as acrylates. These are not typically cured with heat, but rather, by irradiation.

Accordingly, it would be desirable from both a processing and an environmental standpoint to have waterborne coating compositions that cure with heat in conjunction with foamable layers that expand and cure with heat. It would also be desirable to have waterborne coating compositions that are rigid enough to provide suitable stain resistance and wear resistance, but that are flexible enough that a foamable layer can be chemically embossed while the coating layer is cured. The present invention provides such a waterborne coating composition.

SUMMARY OF THE INVENTION

Waterborne coating compositions, methods of applying such compositions, and substrates coated with such compositions are described. The compositions include an aqueous dispersion of a polyurethane resin, an epoxy resin, and a polyvinyl chloride resin. In one embodiment, one or more of these resins includes reactive functional groups that react with epoxy groups and/or aminoplasts. The compositions can also include an aminoplast such as a melamine, and one or more curing agents. Additionally, the compositions can include flatting agents, colored metallic and/or polymeric particles, surfactants, rheology modifiers, defoamers, coalescing aids and hard particles.

In one embodiment, the composition is an aqueous dispersion that includes an epoxy dispersion (0.01–30% by weight, in another embodiment, 14–30% by weight), polyurethane dispersion (0.01–35% by weight) and a vinyl dispersion (4–60% by weight, in another embodiment, 4–40% by weight). The composition also includes a melamine crosslinker (3.5–9.1% by weight). In another embodiment, then composition further includes two curing agents, one that induces curing at a faster rate and/or a lower temperature than the other. Examples of such curing agents are Nacure 2547, which can, for example, be present at between 0.64 and 2% by weight, and Nacure 1557, which can, for example, be present at between 0.01 and 2.9% by weight.

The coating composition can be applied to virtually any surface and cured using conventional heat curing techniques, whether or not there is a chemically embossed or embossable layer. However, it is advantageously used in surface coverings in combination with a chemically embossed or embossable layer. For example, the coating composition can be applied directly to a felt backing layer, a polymeric support layer or a similar substrate and cured. The felt backing, polymeric support layer or similar substrate can include, for example, a hot melt calendared layer, a foamable gel layer and/or a clear wear layer. A pattern including a foaming agent, promotor or inhibitor can be printed or applied adjacent to the foamable gel such that, when heated, a chemically embossed surface is produced in register with the agent, promotor or inhibitor. The waterborne coating layer is typically the top coat, although it need not be the top coat.

Optionally, one or more of the above-layers can be mechanically embossed. This is typically accomplished by heating the layer to be embossed to a temperature at which the layer is softened and subjecting the softened layer to an embossing roll under pressure.

In one embodiment, the surface covering includes a chemically embossed layer and a cured top coat, which are both cured in a single heating step or plurality of heating steps. Ideally, the top coat has good wear and stain resistance properties, and the chemical embossing in the foamable layer occurs while the cop coat is cured. However, in other embodiments, the coating composition can be applied to a surface covering that does not include a chemically embossed layer.

DETAILED DESCRIPTION OF THE INVENTION

The present invention is directed to waterborne coating compositions, methods of applying such compositions, and substrates coated with such compositions. The compositions include an aqueous dispersion of a polyurethane resin, a epoxy resin, and a polyvinyl chloride resin. The compositions also can include a melamine and a curing agent, and optionally include more than one curing agent.

The compositions described herein including a combination of PVC, polyurethane and epoxy resins provide a better chemical embossing capability when compared to coatings prepared from compositions including only polyurethane and epoxy resins. The chemical embossing is sharper and deeper, and the same (or better) wear performance is attained.

The coating composition can be applied to virtually any surface and cured using conventional heat curing techniques, whether or not there is a chemically embossed surface. However, it is advantageously used in surface coverings in combination with a chemically embossed layer. The thickness of the coating layer is typically between 0.2 and 1 mils, although thicknesses outside of this range can be prepared.

Composition

The composition is an aqueous dispersion that includes three types of dispersed particles-polyurethane, polyvinyl chloride and epoxy resins. Any suitable particle size that can be stabilized in a dispersion can be used. In one embodiment, the composition also includes a melamine resin. In another embodiment, the composition includes one or more curing agents. When two or more curing agents are used, they can effect the cure at different temperatures or different times at the same temperature.

Polyurethane Resin

Any suitable polyurethane resin can be used. In one embodiment, the polyurethane resins include reactive groups other than epoxy groups, such as hydroxy and/or thiol groups, that react with the epoxy groups in the presence of an acidic catalyst at elevated temperatures. In one embodiment, the epoxy resins have particle sizes are in the range of between 5 and 300 nm, and representative molecular weights in the range of 1,500 and 150,000. Examples of suitable polyurethanes include SpencerKellogg Products EA6010 (30% solids), and various Daotan polyurethanes (Solutia), Bayhydrol polyurethane dispersions (Bayer), such as Bayhydrol PR 435, can also be used. Bayhydrol PR 435 is an aqueous aliphatic polyurethane dispersion that contains only 5% by weight of organic cosolvent, and includes about 35 wt. % solids.

Polyvinyl Chloride Resin

As used herein, polyvinyl chloride is intended to include homopolymers including only vinyl chloride units, copolymers that include two monomers such as vinyl chloride and vinyl acetate, and compositions including such homopolymers and copolymers.

In one embodiment, the polyvinyl chloride resins include reactive groups other than epoxy groups, such as hydroxy and/or thiol groups, that react with the epoxy groups in the presence of an acidic catalyst at elevated temperatures. In one embodiment, the resins are hydroxy terminated resins. In one embodiment, the polyvinyl chloride resins have particle sizes in the range of between 40 and 600 nm, and representative molecular weights in the range of 5,000 and 60,000. One example of a suitable resin is UCAR Waterborne Vinyl AW-875 (Union Carbide), in which hydroxyl groups are distributed along the backbone and one type of the pendant groups contains a high concentration of carboxylic acid groups. In addition to hydrogen and chlorine atoms, the moieties pendant from the backbone of the polyvinyl chloride polymer are alkyl esters esters and polycarboxylic acid-containing esters. More specifically, the moieties pendant from the polyvinyl backbone of the polyvinyl chloride resin are ester pendant groups selected from the group consisting of acetate, hydroxyl-containing esters, and carboxylic acid-containing esters. The polyvinyl chloride resin may be a polyvinyl chloride homopolymer, a vinyl chloride/vinyl acetate copolymer, a chloride and hydroxyl-containing vinyl polymer, a carboxylic acid-containing vinyl chloride polymer, i.e. the polyvinyl chloride resin consists of vinyl chloride monomers, vinyl acetate monomers, hydroxyl-containing vinyl monomers and carboxylic acid-containing vinyl monomers. The resin has a particle size of about 0.08 micron, a molecular weight of about 24,000, a glass transition temperature of about 80° C., and a hydroxy (OH) equivalent weight of about 1005.

Epoxy Resins

Epoxy resins are well known to those of skill in the art. In one embodiment, the epoxy resins include reactive groups other than epoxy groups, such as hydroxy and/or thiol groups, that react with the epoxy groups in the presence of an acidic catalyst at elevated temperatures. The epoxy resins may include more reactive groups, for example, more hydroxy groups, than epoxy groups. In one embodiment, the epoxy resins have particle sizes are in the range of between 300 and 1,000 nm, and representative molecular weights in the range of 400 and 8,000. An example of a suitable epoxy resin is EPI-REZ Resin 3541-WY-50 (Resolution Performance Products). This resin includes approximately 5 hydroxy groups and 2 epoxy groups per molecule.

Melamine

Aminoplasts, of which melamines are an example, can be present in the compositions. Melamines, also known as triaminotriazines, are well known to those of skill in the art. The melamines may or may not be partially or substantially methylolated, and the methylol groups may or may not be partially or substantially etherified with $C_{1-10}$ straight chain, branched or cyclic alkyl groups.

Many of these compounds are commercially available and sold, for example, as Cymel crosslinking agents by the Cytec Industries, Inc., for example Cymel 301, and as Resimene resins by Solutia. Resimene 745 is an example of a suitable Resimene resin.

Curing Agents

The curing agents are typically acidic catalysts. They can be used to catalyze the curing reaction between the melamine component, polyurethane resins that include reactive groups, such as hydroxy-urethanes, the epoxy component, and polyvinyl chloride resins that include reactive groups, such as hydroxy-PVC resins. Examples of suitable catalysts include sulfonic acids, such as methane sulfonic acid, alkylated arylsulfonic acids such as p-toluenesulfonic acid, alkylated napthylsulfonic acids such as dinonyl napthalene sulfonic acid and dinonyl napthalene disulfonic acid. Other acids such as citric acid, maleic acid, phthalic acid and the like can also be used. The catalysts may be in the free acid form, or can be stabilized, for example, by using an amine to neutralize the acid, for example, an amine blocked dinonylnaphthalene sulfonic acid catalyst. The only restriction is that the catalysts are compatible with other components in the system. Such catalysts are well known to those of skill in the art and their selection is within the capability of the ordinary artisan.

Nacure catalysts (King Industries) are examples of suitable catalysts. Specific examples include Nacure 2547 and Nacure 1557. Nacure 2547 is a faster curing catalyst and 1557 is a slower curing catalyst. Nacure 1557 (dinonylnaphthalene sulfonic acid type) requires about 40° C. higher curing temperature than Nacure 2547 (p-toluene sulfonic acid type. In one embodiment, when two curing agents that promote curing at different temperatures are used, the curing temperatures differ by at least about 25° C. When a combination of catalysts is used, the catalysts may each effect a cure at different temperatures, or at different times at the same temperature.

Surfactants

Surfactants can be added to impart additional stain resistance to the coated substrate. Examples of suitable surfactants include fluoroaliphatic and non-ionic surfactants. Combinations of surfactants can also be used. Examples of suitable surfactants include Fluorad surfactants such as Fluorad FC-340 and Fluorad FC-170-C (3-M Company) and Igepal-type surfactants. In one embodiment, a non-foaming commercially available surfactant is used, which has the properties of both a surfactant and defoamer. CoatOSil1211 (Witco) is an example of a suitable non-foaming surfactant. It is a composition of trisiloxane alkoxylate, siloxane polyalkyleneoxide copolymer and polyalkylene oxide.

Optional Components

Defoamers can be added in suitable quantities. Colloid 640/rhodoline 640 is an example of a silica-type defoamer that includes petroleum hydrocarbon, hydrophobic silica and amorphous silica.

Various flatting additives are known for adjusting the gloss level of coatings. Such additives can be added to the compositions described herein. Pergopak M-3 is an example of a suitable gloss-adjusting additive. Pergopak M3 can be included in various concentrations to provide varying levels of gloss. For example, a high gloss can be obtained with little or no added Pergopak M3, a low gloss with about 1.12%, and an ultra-low gloss with about 2.38% by weight. Typically, no more than about 2.5% by weight is used.

Metallic and/or polymeric particles, hard particles and colored particles can also be added. Coalescing aids can also be added. Texanol coalescing aids (Eastman Chemicals) are an example of a suitable coalescing aid. Rheology modifiers, such as Acrysol® brand rheology modifiers, can also be added. Acrysol RM-825 is an example of a suitable non-ionic rheology modifier.

Hard particles include, but are not limited to, aluminum oxide, quartz, carborundum, silica and glass beads. In one embodiment, the hard particles are particles with a hardness of 6 or more on the Mohs scale.

Surface Coverings

Virtually any surface covering substrate can be coated with the coating compositions described herein. Examples of surface covering substrates that can be prepared using the compositions and methods described herein include those described, for example, in U.S. Pat. No. 4,781,987, U.S. Pat. No. 4,855,165 and U.S. Pat. No. 5,643,677, the contents of which are hereby incorporated by reference.

Examples of surface covering substrates include resilient sheet and tile goods that include crosslinked wear layers, such as those derived from urethanes, (meth)acrylated urethanes, unsaturated polyesters and the like, all of which are well known to those of skill in the art.

The surface covering substrates may include a resilient support surface. Such surfaces are well known in the art, and include, for example, vinyl polymers such as polyvinyl chloride. The layers can be formed, for example, from backing materials, plastisols, foamed plastisols, randomly dispersed vinyl particles, stencil disposed vinyl particles, and the like. The selection of these materials is within the skill of an ordinary artisan. The thickness of such support surfaces are typically, but not necessarily, in the range of 10 to 100 mils. A felt base layer may also be used. The thickness of such a felt layer is typically, but not necessarily, in the range of 15 to 30 mils.

The resilient support layer can include or be adjacent to a hot-melt calendared layer, for example, of a polyvinyl chloride, polyolefin or other thermoplastic polymer. The thickness of this layer may be from 15 to 60 mils, although thicknesses outside this range can be used.

In one embodiment, the surface covering includes a chemically embossed layer, formed before, during or after the coating composition is applied and cured. This type of layer is typically applied as a foamable gel, and the gel can include foaming agents or foaming promoters or inhibitors. The thickness of the gel layer is typically, but not necessarily, in the range of 6 to 20 mils in an un-blown state, and between 12 and 60 mils when blown ("cured"). The foaming agents, promoters or inhibitors can be present in the gel layer and/or present in a printed pattern in an adjacent layer to the gel layer. Printed pattern layers are typically less than one mil in thickness when applied using a rotogravure process, or one mil or greater when applied using a screen process. Such agents provide chemical embossing in register with the agents, where the foamed portion corresponds to the presence of the foaming agent and/or promotor, and the un-foamed foamed portion corresponds to the absence of the foaming agent and/or the presence of a foaming inhibitor. Typically, the foaming is done by subjecting the foamable layer to elevated temperatures, for example, in the range of 120 to 250° C., in one embodiment, between 180 and 250° C., for between 0.5 and 10 minutes, and these conditions can also be used to cure a top layer including the compositions described herein.

A clear wear layer can be but is not necessarily applied over the gel layer, typically but not necessarily with a thickness of between 10 and 20 mils. Such layers are commonly formed of a material that includes a PVC plastisol.

The top coat layer formed using the waterborne coating compositions described herein, can be, but is not necessarily in the range of between 0.2 and 5 mils thickness.

In some embodiments, one or more layers can be mechanically embossed. In those embodiments where the cured top coat layer is mechanically embossed, the embossing may take place after the top coat layer is cured and then heated to soften the layer.

In one embodiment, the finished surface covering includes a resilient support surface, a chemically embossed layer and a top coat layer. In this embodiment, a foamable layer can be applied to a support layer, a print layer or other layer, where the foamable layer includes or is in contact with foaming agents, inhibitors and or promoters, either throughout the entire layer or in the form of a pattern. The top coat layer is formed by applying the waterborne coating composition to the foamable layer or a layer directly or indirectly overlying the foam layer, and curing the composition. For example, a clear wear layer may be applied to the foamable gel layer, and the coating composition applied over the clear wear layer.

In one embodiment, the waterborne composition is cured in the same relevant time frame as the foamable layer. In those embodiments where the foamable layer includes a pattern of foaming agents, inhibitors and/or promoters such as to form a chemically embossed layer when the foamable layer is "cured" or foamed, the waterborne coating does not significantly adversely affect the chemical embossing of the foamable layer. The wear layer has the ability, when thermally cured, to conform to the physical deformations in the cured foamable layer and has improved scratch and stain resistance properties relative to the properties of the foamable layer.

Methods of Applying the Composition

The coating composition is advantageously stirred to maintain the dispersion of the particles until it is to be applied. The coating composition can be applied to virtually any surface using techniques well known to those of skill in the art, for example, roll coaters, flow coaters or blade applicators such as bird blades and drawdown blades. After the compositions are applied, they can be heated, for example, above around 100° C., to remove the majority of the water that is present.

Chemical Embossing

In those embodiments in which there is a foamable gel layer, the layer may include various foaming agents, foaming inhibitors and/or foaming promoters. Such agents, inhibitors and/or promoters, which are well known to those of skill in the art, can also be present in an adjacent print layer. With different amounts or concentrations of foaming agent in a particular region, for example, in register with a print pattern, the foamable layer is foamed to different levels, resulting in chemical embossing. The presence of a foaming promoter or inhibitor in the pattern also affects the degree of foaming in the pattern.

Mechanical Embossing

Mechanical embossing is typically done by subjecting the surface covering to an embossing roll under pressure, typically at a temperature at which the layer to be mechanically embossed is softened enough to be embossed. After the mechanical embossing, the layers may be annealed at a lower temperature, if desired. Such techniques are well known to those of skill in the art.

Methods of Curing the Composition

The compositions can be cured using conventional heat curing techniques, for example, exposure to microwave, IR irradiation or heated air impingement ovens, whether or not there is a chemically embossed surface. However, it is advantageously used in surface coverings in combination with a chemically embossed layer.

Suitable temperature ranges for heat curing a foamable layer and a waterborne composition including epoxy resins and/or melamine resins are well known to those of skill in the art. Temperatures typically range from 120 to 250° C., in one embodiment, from 180 to 250° C., although temperatures outside of these ranges can be used provided they are effective at curing the foamable layer and/or waterborne coating composition. The heat curing can be effected at a plurality of temperatures and heating stations. Alternatively, the curing can be effected at one temperature, where one of the foamable layer and the wear layer is cured faster than the other. For example, when a combination of curing agents is used, one curing agent in the composition can initiate and partially cure the top coat at a first temperature while the foamable layer is expanding and curing, and a second curing agent can finish the cure of the top coat at a second, higher temperature. This can permit the chemical embossing to take place while the top coat is flexible, and permit the top coat to completely cure after the chemical embossing takes place. This advantageously provides adequate chemical embossing and a rigid top coat.

An example of a suitable surface covering includes a hot-melt calendared layer overlying a felt support layer and a foamable gel layer overlying the hot-melt calendared layer. A print layer overlies the foamable gel layer, and a clear wear layer overlies the print layer. The waterborne coating is used to form a top coat layer that overlies the clear wear layer.

The present invention will be better understood with reference to the following non-limiting example.

EXAMPLE 1

Example of a Waterborne Composition

In one embodiment, the epoxy dispersion is 0.01–30%, the polyurethane dispersion is 0.01–35%, the vinyl dispersion is 4%–60%, Nacure 2547 is 0.64%–2%, Nacure 1557 is 0.01%–2.9%, and a melamine crosslinker such as Resimene 745 is 3.5%–9.1% by weight of the composition. Resin solids level are 50%, 35% and 39%, respectively, for epoxy dispersion, polyurethane dispersion and vinyl dispersion resins. In another embodiment, the epoxy dispersion is 14–30% by weight, and the vinyl resin is 4–40% by weight of the composition. In another embodiment, the epoxy resin and polyurethane dispersion are each present in at least one percent by weight of the composition.

EXAMPLE 2

Flooring Structure Including the Waterborne Coating Composition

A flooring structure including a 15 mils felt backing layer, a 20 mils PVC melt-calendared layer, a 10 mils foamable gel layer, a rotogravure printed pattern with inhibitor containing inks in specific locations, and a 15 mils gelled clear plastisol layer was prepared. A top coat coposition including 306.00 gram Bayhydrol PR 435, 259.10 gram EPI-REZ Resin 3541-WY-50, 69.60 gram UCAR Waterborne Vinyl AW-875, 90.25 gram Resimene 745, 5.0 gram CoatOSil 1211, 17.90 gram Texanol, 3.90 gram Acrysol RM-825, 7.60 gram Nacure 2547, 9.40 gram Nacure 1557 and 231.25 D.I. water was prepared. The composition was applied to the plastisol layer by forward roll coater at an application rate that resulted in about 0.5 mils dry coating thickness. The coated substrate was conveyed into a fusion and expansion oven heated at 190° C. for two minutes. The final expanded and cured composition exhibited excellent chemical embossing and excellent top coat stain resistance.

The present invention is not restricted solely to the descriptions and illustrations provided above, but encompasses all modifications envisioned by the following claims.

The invention claimed is:

1. A waterborne coating composition consisting essentially of dispersed polyurethane resin particles, dispersed epoxy resin particles, dispersed polyvinyl chloride resin particles, and a component selected from the group consisting of at least one curing agent, at least one aminoplast, at least one flatting agent, polymeric particles, colored particles, hard particles having a hardness of at least 6 on the Mohs scale, at least one surfactant, at least one rheology modifier, at least one defoamer, at least one coalescing aid and combinations thereof, wherein the composition is an aqueous dispersion and, in addition to hydrogen atoms and chlorine atoms, the moieties pendant from the polyvinyl backbone of the polyvinyl chloride resin consist of ester pendant groups selected from the group consisting of an alkyl ester, a carboxylic acid-containing ester and combinations thereof.

2. A waterborne coating composition comprising:
   a) dispersed polyurethane resin particles,
   b) dispersed epoxy resin particles,
   c) dispersed polyvinyl chloride resin particles,
   d) a first curing agent, and
   e) a second curing agent,
wherein the first curing agent promotes curing at a first temperature and the second curing agent promotes curing at a second different temperature, and the composition is an aqueous dispersion.

3. The composition of claim 1, wherein the aminoplast resin is a melamine resin.

4. The composition of claim 2, wherein the first temperature and the second temperature differ by at least 25° C.

5. The composition of claim 1, wherein at least one of the polyurethane resin, epoxy resin and polyvinyl chloride resin comprises a functional group reactive with an epoxy group in the presence of an acid catalyst under conditions of elevated temperature.

6. The composition of claim 5, wherein the functional group comprises an hydroxy group.

7. A waterborne coating composition consisting essentially of dispersed polyurethane resin particles, dispersed epoxy resin particles, dispersed polyvinyl chloride resin particles, and a component selected from the group consisting of at least one curing agent, at least one aminoplast, at least one flatting agent, polymeric particles, colored particles, hard particles having a hardness of at least 6 on the Mohs scale, at least one surfactant, at least one rheology modifier, at least one defoamer, at least one coalescing aid and combinations thereof, wherein the composition is an aqueous dispersion and, in addition to hydrogen atoms and chlorine atoms, the moieties pendant from the polyvinyl backbone of the polyvinyl chloride resin consist of ester pendant groups selected from the group consisting of acetates, hydroxyl-containing esters, carboxylic acid-containing esters, and combinations thereof.

8. The composition of claim 7, wherein the aminoplast is a melamine resin.

9. A waterborne coating consisting essentially of dispersed polyurethane resin particles, dispersed epoxy resin particles, dispersed polyvinyl chloride resin particles, and a component selected from the group consisting of at least one curing agent, at least one aminoplast, at least one flatting agent, polymeric particles, colored particles, hard particles having a hardness of at least 6 on the Mohs scale, at least one surfactant, at least one rheology modifier, at least one defoamer, at least one coalescing aid and combinations thereof, wherein the composition is an aqueous dispersion and the polyvinyl chloride resin is selected from the group consisting of polyvinyl chloride homopolymer, vinyl chloride/vinyl acetate copolymer, chloride and hydroxyl-containing vinyl polymers, chloride and carboxylic acid-containing vinyl polymers, and combinations thereof.

10. The composition of claim 9, wherein the polyvinyl chloride resin is a polyvinyl chloride homopolymer.

11. The composition of claim 9, wherein the polyvinyl chloride resin is a vinyl chloride/vinyl acetate copolymer.

12. The composition of claim 9, wherein the aminoplast is a melamine resin.

13. A waterborne coating composition consisting essentially of dispersed polyurethane resin particles, dispersed epoxy resin particles, dispersed polyvinyl chloride resin particles, and a component selected from the group consisting of at least one curing agent, at least one aminoplast, at least one flatting agent, polymeric particles, colored particles, hard particles having a hardness of at least 6 on the Mohs scale, at least one surfactant, at least one rheology modifier, at least one defoamer, at least one coalescing aid and combinations thereof, wherein the composition is an aqueous dispersion and the polyvinyl chloride resin consists of monomer units selected from the group consisting of vinyl chloride monomer units, vinyl acetate monomer units, hydroxyl-containing vinyl monomer units, carboxylic acid-containing vinyl monomer units and combinations thereof.

14. The composition of claim 13, wherein the aminoplast is a melamine resin.

15. The composition of claim 2, wherein the first and second curing agents are acidic catalysts.

16. The composition of claim 2, wherein at least one of the curing agents is an amine blocked acidic catalyst.

17. The composition of claim 2, wherein, in addition to hydrogen atoms and chlorine atoms, the moieties pendant from the polyvinyl backbone of the polyvinyl chloride resin consist of ester pendant groups selected from the group consisting of an alkyl ester, a carboxylic acid-containing ester and combinations thereof.

18. The composition of claim 2, wherein, in addition to hydrogen atoms and chlorine atoms, the moieties pendant from the polyvinyl backbone of the polyvinyl chloride resin consist of ester pendant groups selected from the group consisting of acetates, hydroxyl-containing esters, carboxylic acid-containing esters, and combinations thereof.

19. The composition of claim 2, wherein the polyvinyl chloride resin is selected from the group consisting of polyvinyl chloride homopolymer, vinyl chloride/vinyl acetate copolymer, chloride and hyciroxyl-containing vinyl polymers, chloride and carboxylic acid-containing vinyl polymers, and combinations thereof.

20. The composition of claim 2, wherein the polyvinyl chloride resin consists of monomer units selected from the group consisting of vinyl chloride monomer units, vinyl acetate monomer units, hydroxyl-containing vinyl monomers units, carboxylic acid-containing vinyl monomer units and combinations thereof.

* * * * *